United States Patent [19]

Brown

[11] Patent Number: 5,498,106

[45] Date of Patent: Mar. 12, 1996

[54] CORING ROD REALIGNMENT TOOL

[76] Inventor: David M. Brown, 81 Lowson Crescent, Winnipeg, Manitoba, Canada, R3P 0T3

[21] Appl. No.: 348,477

[22] Filed: Dec. 2, 1994

[51] Int. Cl.⁶ ........................................ F16L 1/10
[52] U.S. Cl. ........................................ 405/184; 405/154
[58] Field of Search ................... 405/184, 154, 405/158; 285/24, 27

[56] References Cited

U.S. PATENT DOCUMENTS

| 5,033,907 | 7/1991 | O'Donnell et al. | 405/158 |
| 5,306,101 | 4/1994 | Rockower et al. | 405/154 |

Primary Examiner—Ramon S. Britts
Assistant Examiner—Frederick L. Lagman

[57] ABSTRACT

The coring rod realignment tool of the present invention is comprised of a body that has a fixed arm which protrudes beyond one of its sides, and a sliding arm that protrudes beyond an opposite side. The slideable arm can be positioned so that its end that protrudes out from the body is in horizontal alignment with the protruding portion of the fixed arm, and it can be moved so that its end that protrudes out from the body is not in horizontal alignment with the end of the fixed arm that protrudes from the body, but is parallel to that end. The portion of the fixed arm, and the portion of the slideable arm, that protrudes out from the body, is coupleable a coring rod of the type used in conjunction with a coring knife, in the installation of horizontal underground piping.

6 Claims, 4 Drawing Sheets

CORING ROD REALIGNMENT TOOL

BACKGROUND OF THE INVENTION

1. Field of the Invention

This invention relates to installing sections of underground piping, and more specifically, to a new tool for realigning a coring rod.

2. Description of Related Art

Methods and apparatuses have been developed to allow for the laying of underground piping, which is to run substantially parallel to the surface which it is under, without having to first dig up the surface under which the piping will ultimately lie. Generally, those methods and apparatuses involve installing the piping horizontally underground, between two pits, an entry pit and an exit pit, that flank the surface area under which the piping is to be horizontally laid. A recently invented method of laying horizontal underground piping, without digging up the surface under which it is to be laid, is disclosed in co-pending patent application no. 08/320,751 one of the components used in co-pending patent application no. 08/320,751 is a coring rod. As explained in application no. 08/320,751, initially, from the entry pit at one end of the site under which the piping is to be laid, at the desired depth of the center of the piping tunnel, a pilot rod is horizontally inserted into the site, and pushed through the site until part of it extends into the exit pit at the other side of the site. A coring rod must then be pulled back through the site, through the tunnel hole that has been made in the site by the pilot rod.

It can happen that as the pilot rod was initially being pushed through the site, from the entry pit to the exit pit, that it encounters underground rocks, or other harder areas along its path under the site, or that it encounters unusually soft areas, any of which will cause the pilot rod to deviate from its anticipated path under the site. When that happens, the pilot rod enters the exit pit at a point that is either horizontally or vertically, or both horizontally and vertically, out of line with the point in the entry pit at which it entered the site. The pilot rod, and the tunnel it created under the site, are no longer in line with the anticipated tunnel that it was to have created under the site. When the coring rod is pulled back through the pilot rod's tunnel, from the exit pit to the entry pit, it too will be misaligned.

Because the coring rod is the rod that guides the piping into its desired location in the site, if the coring rod is misaligned, the piping will be misaligned. Accordingly, when a coring rod becomes misaligned it must be realigned before it can be used for its intended purpose.

The methods already known of realigning a coring rod, involve digging a tunnel from the exit pit, back into the site along the originally anticipated path of the pilot rod, and making that tunnel large enough that it connects, along its length, with the misaligned tunnel created by the pilot rod. The end result is a much larger than necessary tunnel, which encompasses the tunnel originally anticipated for the pilot rod, from its point of deviation to the exit pit. The coring rod can then be pulled back through the site, from the exit pit to the entry pit, travelling all the way along its originally anticipated path, by traveling through the portion of the larger than necessary tunnel that incorporates its originally anticipated path, up to the point of deviation, and then from that point, by traveling through the pilot rod created tunnel, which from that point back to the entry pit, is the originally anticipated tunnel. The methods that require the digging of unnecessarily large tunnels to connect up with a deviated pilot rod tunnel, have the obvious disadvantage that they require a great deal of excavation and earth moving that would not be necessary if the pilot rod had not deviated from its anticipated path.

An object of the present invention, is to provide a realignment tool that will allow a misaligned coring rod of the type described in co-pending application no. 08/320,751 to be realigned.

A second object of the present invention, is to provide a realignment tool that is relatively inexpensive to construct.

A third object of the present invention, is to provide a realignment tool that will be durable.

A fourth object of the present invention, is to provide a realignment tool that is easy to use.

A fifth object of the present invention, is to provide a realignment tool that will allow the coring rod to be realigned without having to pull it all the way through the site.

A sixth object of the present invention, is to provide a realignment tool that will allow the coring rod to be realigned after it has only been pulled back through the site to the point where the misalignment occurred.

SUMMARY OF THE INVENTION

The realignment tool of the present invention is comprised of a body that has a stationary arm protruding from one of its sides, and a moveable arm protruding from a second side that is opposite to the first side. The portion of the stationary arm that protrudes from the body is coupleable to a coring rod. The portion of the moveable arm that protrudes from the body is coupleable to a coring rod. The side of the body that the stationary arm protrudes from is shaped to facilitate it being pulled or pushed through solid ground. The stationary arm is rigidly attached to the body in relation to the side of the body it protrudes from such that it and that side of the body will both travel through the ground in the same direction. The moveable arm can be positioned so that its end that protrudes out from the body is in horizontal alignment with the protruding portion of the stationary arm, and it can be moved so that its end that protrudes out from the body is not in horizontal alignment with the end of the stationary arm that protrudes from the body, but is parallel to said end.

In operation, in the exit pit, the stationary arm is coupled to the end of a misaligned pilot rod. The moveable arm is coupled to the end of a coring rod that is in the exit pit. The moveable arm is moved out of alignment with the stationary arm, so that the coring rod will be closer to being in line with, or will be in line with, the anticipated tunnel under the site, that the pilot rod was supposed to create, before it became misaligned. The pilot rod is pulled back through the site. The pilot rod follows the misaligned tunnel that it originally created through the site, however, the coring rod creates its own new tunnel as it is pulled through the site, because it is not in line with the pilot rod. Once the pilot rot, with realignment tool attached, reaches the point at which the misalignment occurred, the pilot rod's direction of travel is reversed, and it is pushed back into the site, toward the exit pit. The stationary arm and body of the tool will then slide down in relation to the moveable arm, so that the pilot rod is now traveling in line with the coring rod, back through the site, along the path Just created by the coring rod, which is either the correct originally anticipated path, or is closer to the originally anticipated path. The pilot rod and the coring rod, with the coring rod realignment tool connecting them, will re-emerge In the exit pit through the tunnel opening created by the coring rod, which will either be closer to being in line with the originally anticipated tunnel, or will actually be in line with the originally anticipated tunnel.

If the created coring rod tunnel, in the exit pit, is closer but not in line with the originally anticipated tunnel, then the moveable arm on the alignment tool is again moved out of line with the stationary arm, and in a direction such that it is now actually in line with, or is closer to being in line with, the originally anticipated tunnel, and the pilot rod is again pulled back through the site until the point in the site at which the deviation occurred, then the pilot rod's direction of travel is reversed, and it is pushed back into the site, toward the exit pit. The stationary arm and body of the tool will then slide down in relation to the moveable arm, so that the pilot rod is now traveling in line with the coring rod, back through the site, along the path Just created by the coring rod, which is either the correct originally anticipated path, or is closer to the originally anticipated path. The pilot rod and the coring rod, with the coring rod realignment tool connecting them, will re-emerge in the exit pit through the tunnel opening created by the coring rod, which will either be closer to being in line with the originally anticipated tunnel, or will actually be in line with the originally anticipated tunnel.

By repeating the procedure of moving the moveable arm out of alignment with the stationary arm, each time the pilot rod and coring rod are pushed back into the exit pit, and then pulling the rods back through the tunnel to the point of deviation, and from the point of deviation pushing the rods back into the exit pit, until the coring rod tunnel is the originally anticipated tunnel, the misalignment is corrected.

The objects of the invention have been accomplished. The coring rod realignment tool of the present invention, will allow a misaligned coring rod of the type described in co-pending application no. 08/320,751 to be realigned. The tool is relatively inexpensive to construct, durable, and easy to use. The tool of the present invention does not require the coring rod to have to be pulled all the way through the site in order to effect correction, and does not require it to be pulled back through the site significantly beyond the point where the misalignment occurred.

DESCRIPTION OF THE PREFERRED EMBODIMENT

Figure 1:
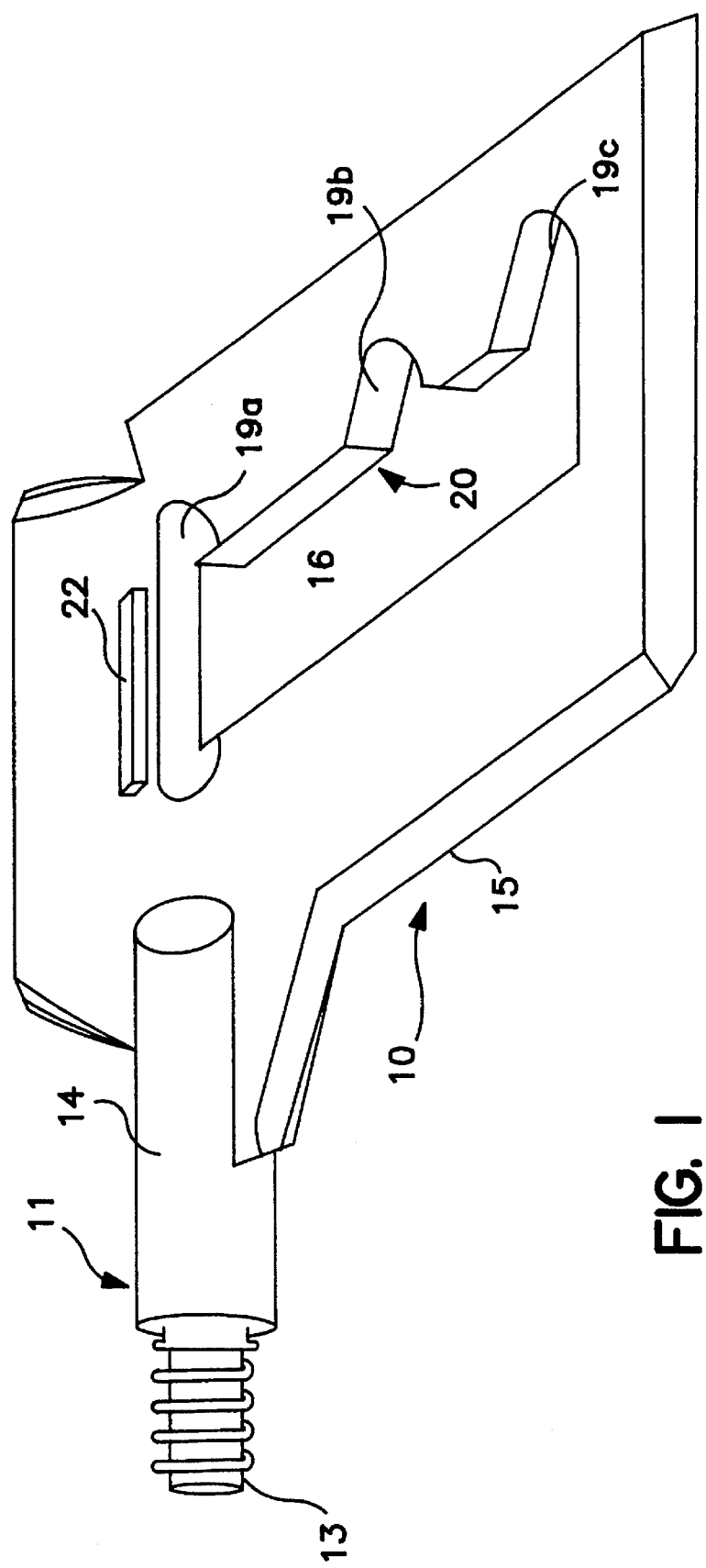
FIG. 1 is a perspective view of a preferred embodiment of the body of a realignment tool.
Figure 2:
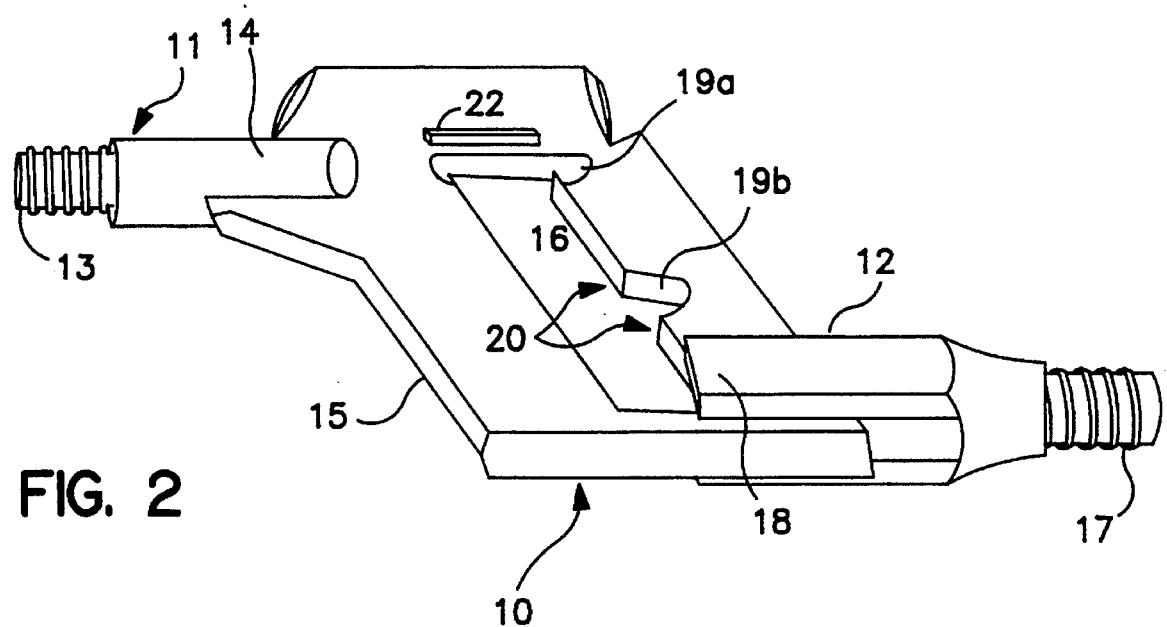
FIG. 2 is a perspective view of a preferred embodiment of a realignment tool with its moveable arm in the third position.
Figure 3:
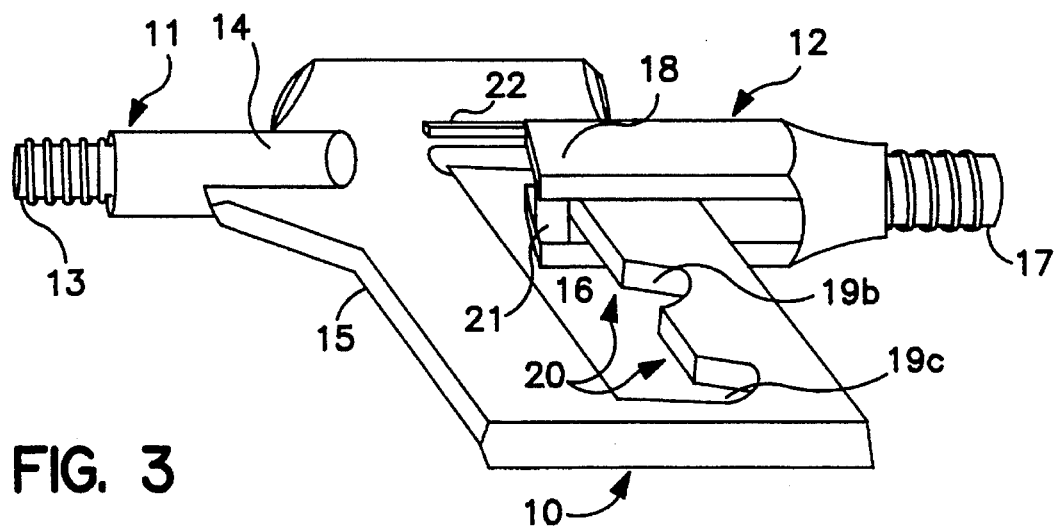
FIG. 3 is a perspective view of a preferred embodiment of a realignment tool with its moveable arm in the first position.

The preferred embodiment of the body of a realignment tool of the present invention is illustrated in FIG. 1. The preferred embodiment of the realignment tool is illustrated in FIGS. 2 and 3. The coring rod realignment tool is comprised of a body 10, which has a stationary arm 11, and a moveable arm 12. The moveable arm 12 has a first end 17 that is coupleable to a coring rod, and a second end 18.

The stationary arm 11 is either formed as part of the body 10, or is rigidly attached to the body. The stationary arm 11 has a first end 13, and an opposite lying second end 14. The first end 13 is coupleable to a coring rod. The body 10 has a cutting face 15, shaped to cut through solid ground when pulled or pushed with sufficient force. The cutting face 15 is positioned relative to the first end 13 of the stationary arm 11, such that both the first end 13, of the stationary arm 11, and the cutting face 15, will move through the ground in the same direction.

The body 10 has an aperture 16 in which the second end 18 of the moveable arm is free to move. Bays 19a, 19b, and 19c, are spaced vertically down from the top of the aperture 16, along the defining vertical wall 20, which lies farthest from the cutting face 15. The second end 18, of the moveable arm, has a cylindrical post 21 which can fit within any of the bays 19a, 19b, and 19c.

When the cylindrical post 21 is slid into the top most bay 19a, the first end 17 of the moveable arm can lie in alignment with the first end 13 of the stationary arm, as shown in FIG. 3. When the cylindrical post 21 is slid into either of the other bays, 19b or 19c, the first end 17 of the moveable arm cannot lie in alignment with the first end 13 of the stationary arm, but can lie parallel to the first end 13 of the stationary arm, as shown in FIG. 2.

The blocking portion 22 prevents the moveable arm 12 from being slid vertically within aperture 16 to a point where the first end 17 of the moveable arm could not be placed in alignment with the first end 13 of the stationary arm.

In the preferred embodiment the entire realignment tool is made out of metal. The stationary arm is welded to the body, and the blocking portion is welded to the body.

In the preferred embodiment the means of attaching the stationary arm and the means of attaching the moveable arm, to the coring rod, are screw threads.

Figure 4:
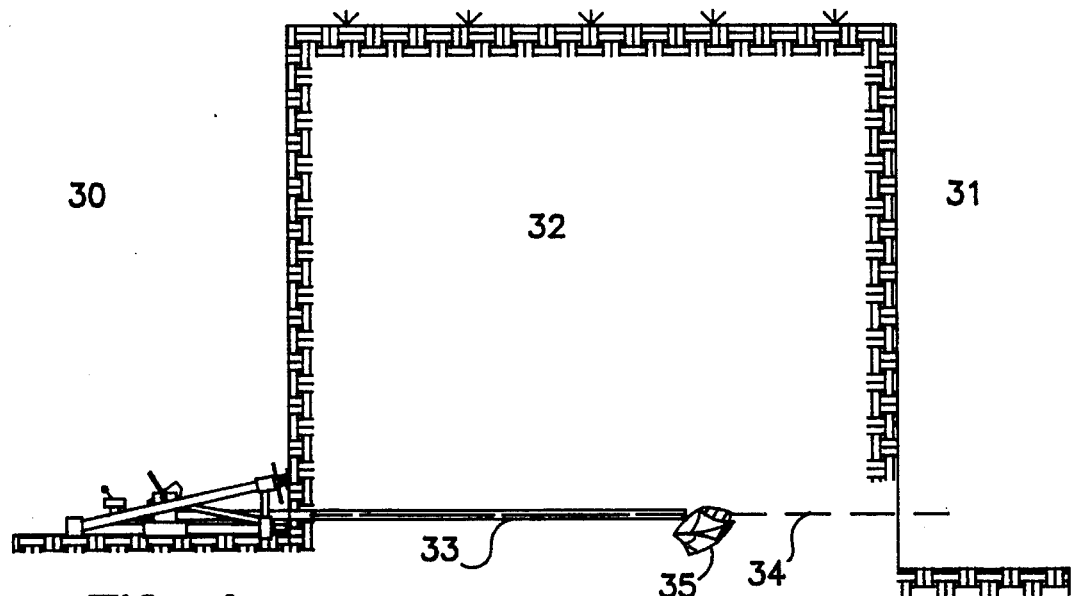
FIG. 4 is a drawing of a pilot rod that has been pushed two thirds of the way through the pipe laying site and has struck an underground rock.
Figure 5:
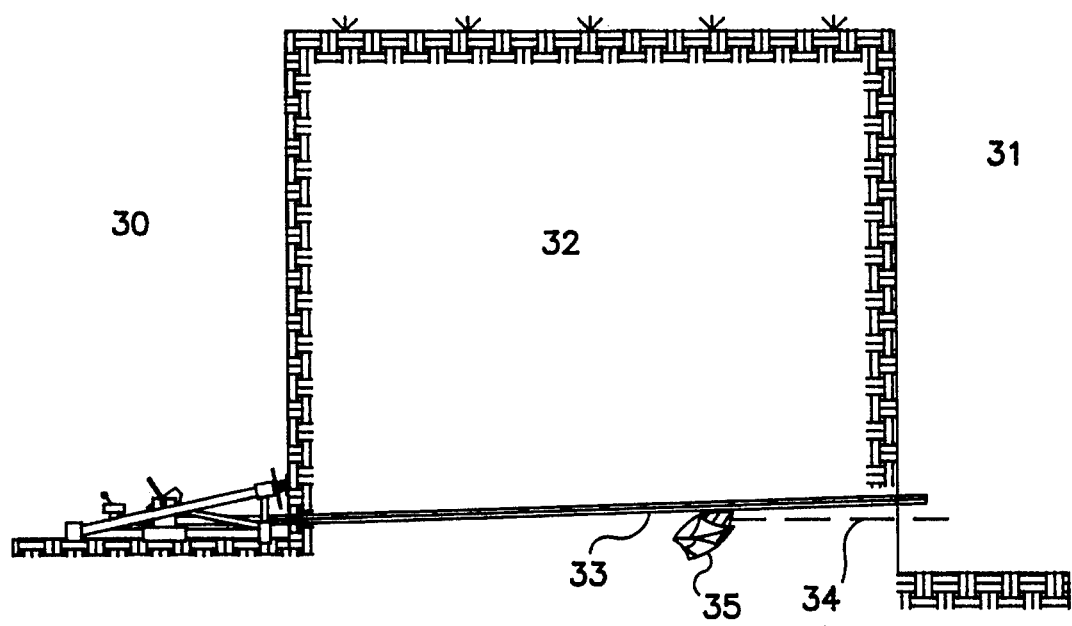
FIG. 5 is a drawing of a pilot rod that has been pushed all of the way through the underground pipe laying site after having struck an underground rock two thirds of the way through the site.
Figure 6:
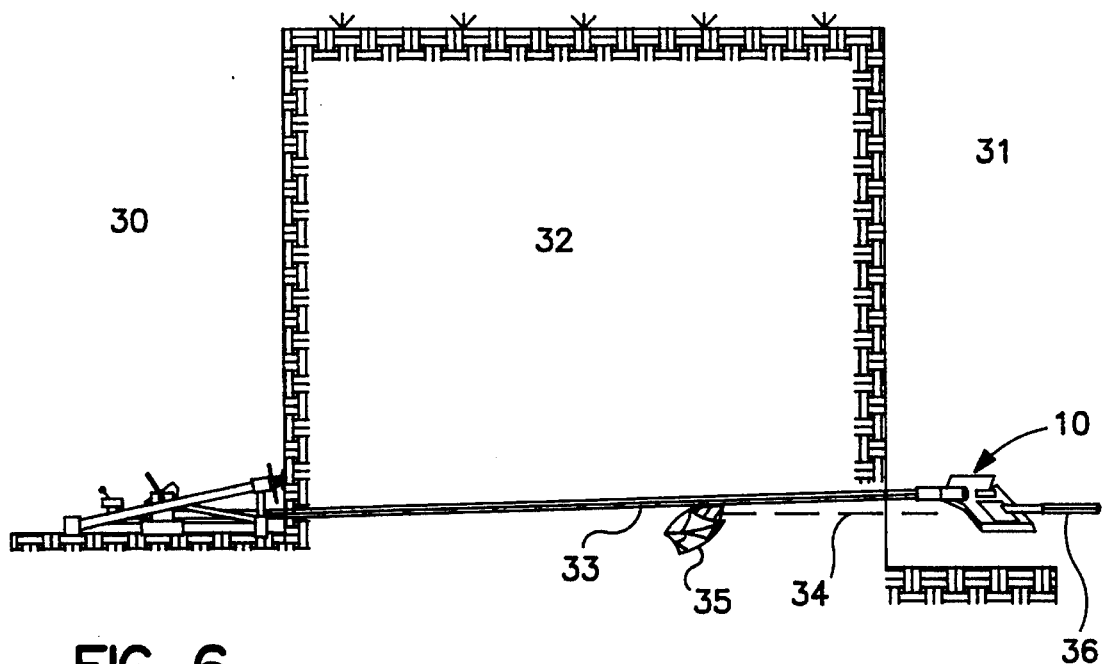
FIG. 6 is a diagram of a preferred embodiment of a realignment tool immediately after it has been connected to the pilot rod and a coring rod, in preparation for use.

FIGS. 4 to 7 illustrate the operation of the coring rod realignment tool. FIG. 4 illustrates a pilot 33 bing pushed through the site 32. Rock 35 is blocking the anticipated path 34 of pilot rod 33. The result is illustrated in FIG. 5. The pilot rod 33 has exited the site, into exit pit 31, above the anticipated path 34. In FIG. 6 the stationary arm of the coring rod realignment tool is attached to the pilot rod, and the moveable arm is attached to the coring rod 36. The deviation from the anticipated path 34 is not very great, and the moveable arm is slid to bay 19b, which is sufficient to correct the misalignment.

Figure 7:
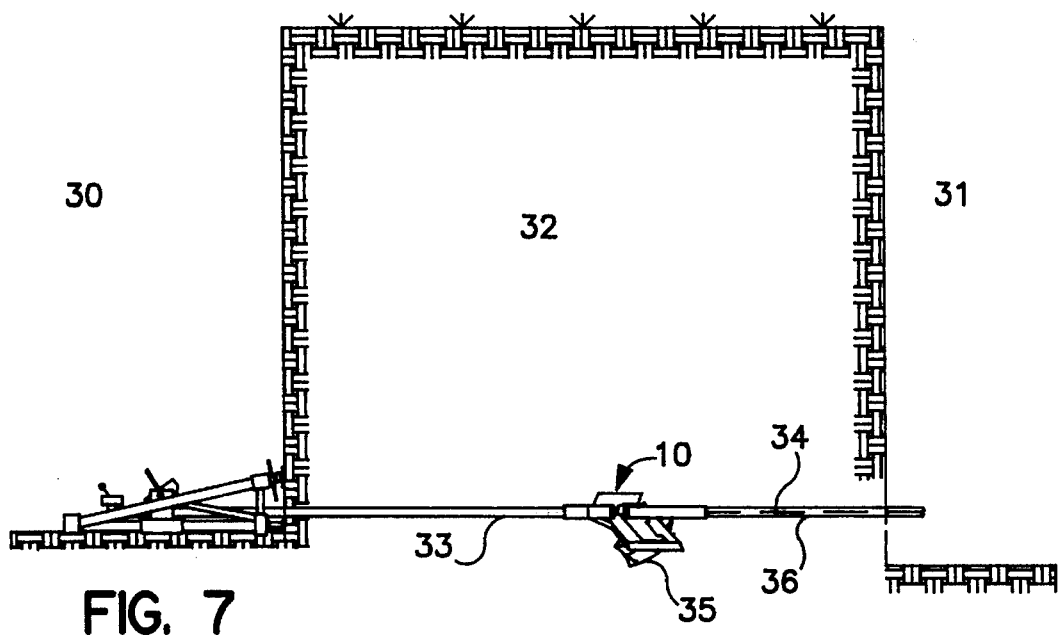
FIG. 7 is a diagram of a preferred embodiment of a realignment tool connected to a pilot rod and a coring rod, after it has realigned the coring rod.

The pilot rod is pulled back through the site, and as illustrated in FIG. 7, once the coring rod realignment tool reaches the rock 35, which is the point at which the pilot rod began to deviate from its anticipated path, it either pushes on rock 35, or travel closely around rock 35. The end result is that the tunnel created by the coring rod is, in the case of the example illustrated in the diagrams, in line with the anticipated correct tunnel path 34, from the exit pit 31, up to the point of deviation. The tunnel created by the pilot rod is the anticipated correct tunnel path from the entry pit 30, up to the point of deviation. Accordingly, even if at the exact point of deviation the tunnel has a slight curve to it, the path now available for travel by a coring rod, from exit pit 31 to entry pit 30, is the correct, anticipated path, because minor deviations at any singular points along the tunnel path will have only a negligible impact on the pipe installation process, and accordingly, can be ignored.

In general, once the pilot rod has been pulled back to the beginning of the point of deviation, and its path is reversed so that it is now again being pushed back toward the exit pit, the stationary arm and body of the tool will then slide down in relation to the moveable arm, so that the pilot rod is now traveling in line with the coring rod, back through the site, along the path just created by the coring rod, which is either the correct originally anticipated path, or is closer to the originally anticipated path. The pilot rod and the coring rod, with the coring rod realignment tool connecting them, will re-emerge in the exit pit through the tunnel opening created by the coring rod, which will either be closer to being in line with the originally anticipated tunnel, or will actually be in line with the originally anticipated tunnel. If the pilot rod is still not at the correct position in the exit pit, then the procedure will be repeated, until it finally emerges in the correct position in the exit pit.

When the pilot rod does emerge in the correct position in the exit pit, then the correct tunnel for the coring rod has been achieved. The coring rod realignment tool, which is also now in the exit pit, will then be detached from the pilot rod, and the laying of the underground piping will be carried out in the same way it would have been carried out had the pilot rod never deviated from its anticipated path.

Some variations in the embodiments of the tool as described above can be seen to be within the scope of the invention, and will be obvious to those skilled in the art, and are included within the scope of the claims.

I claim:

1. A coring rod realignment tool comprised of:
   (a) a stationary arm that has a first end, and a second end, wherein the first end is coupleable to a coring rod;
   (b) a cutting body, the front face of which is shaped to facilitate it being pulled or pushed through solid ground, that is rigidly attached to the second end of the stationary arm, such that the first end of the stationary arm and the front face of the cutting body will both travel through the ground in the same direction;
   (c) a moveable arm that has a first end, and a second end, wherein the first end is coupleable to a coring rod, and the second end is moveably coupled with the cutting body, wherein the moveable arm, can be moved, while coupled with the cutting body, so that its first end is in alignment with the first end of the stationary arm, and wherein the moveable arm can be moved, while coupled with the cutting body, so that its first end is out of alignment with, and substantially parallel to, the first end of the stationary arm.

2. A coring rod realignment tool as defined in claim 1, wherein the means by which the first end of the stationary arm is coupleable to a coring rod are screw threads formed as part of the first end of the stationary arm; and wherein the means by which the first end of the moveable arm is coupleable to a coring rod, are screw threads formed as part of the first end of the moveable arm.

3. A coring rod realignment tool as defined in claim 1, wherein the means by which the second end of the moveable arm are coupled with the cutting body are an aperture within the cutting body and a portion of the second end of the moveable arm that is moveably trapped within said aperture.

4. A coring rod realignment tool as defined in claim 1, wherein the means by which the first end of the stationary arm is coupleable to a coring rod are screw threads formed as part of the first end of the stationary arm; and wherein the means by which the first end of the moveable arm is coupleable to a coring rod, are screw threads formed as part of the first end of the moveable arm; and wherein the means by which the second end of the moveable arm are coupled with the cutting body are an aperture within the cutting body and a portion of the second end of the moveable arm that is moveably trapped within said aperture.

5. A coring rod realignment tool as defined in claim 1, wherein the means by which the second end of the moveable arm are coupled with the cutting body, are an aperture within the cutting body that has at least two indented portions along its defining vertical wall that is farthest from the first end of the stationary arm, and a portion of the second end of the moveable arm that is moveably trapped within said aperture, which trapped portion can fit within any one of the indented portions of said defining wall.

6. A coring rod realignment tool as defined in claim 1, wherein the means by which the first end of the stationary arm is coupleable to a coring rod are screw threads formed as part of the first end of the stationary arm; and wherein the means by which the first end of the moveable arm is coupleable to a coring rod, are screw threads formed as part of the first end of the moveable arm; and wherein the means by which the second end of the moveable arm are coupled with the cutting body, are an aperture within the cutting body that has at least two indented portions along its defining vertical wall that is farthest from the first end of the stationary arm, and a portion of the second end of the moveable arm that is moveably trapped within said aperture, which trapped portion can fit within any one of the indented portions of said defining wall.

* * * * *